United States Patent Office.

JAMES HENDERSON, OF BELLEFONTE, PENNSYLVANIA, ASSIGNOR TO CHARLES G. FRANCKLYN, OF NEW YORK, N. Y.

COMPOUND FOR FURNACE-LININGS AND FIRE-BRICK.

SPECIFICATION forming part of Letters Patent No. 265,073, dated September 26, 1882.

Application filed September 1, 1882. (No specimens.)

*To all whom it may concern:*

Be it known that I, JAMES HENDERSON, of Bellefonte, county of Centre, and State of Pennsylvania, (formerly of New York city,) have invented a new and useful Improvement in Compounds for Furnace-Linings and Fire-Brick, of which the following is such specification as will enable those skilled in the art to understand and make the same.

The object of this invention is to make a compound for furnace-linings or fire-brick for furnaces, converters, and other metallurgic vessels of fluor-spar and lime, magnesian lime, or magnesia, which will be refractory and will not appreciably expand or contract in drying or under the highest temperatures of steel-melting furnaces.

In carrying out this my invention a compound of fluor-spar and lime, magnesian lime, or magnesia in a finely-divided state is mixed with water into a mortar and subjected to a high temperature until the compound is nearly fused, or until it becomes fritted. This substance is then ground to a fine powder or flour and mixed with more fluor-spar and lime or magnesian lime or magnesia and water, so as to make a mortar.

In carrying out this invention I prefer to take magnesian lime made from dolomite or limestone almost free from silica and other impurities, which has been calcined at a low temperature—that is, below redness—after which it is slaked or hydrated with water and brought to the condition of flour. The fluor-spar is ground to a fine flour and mixed with the lime or magnesian lime or magnesia, and water is added until they are brought to the consistency of mortar. This is now subjected to the heat of a steel-melting furnace until thoroughly hardened. This compound is then ground and added to a mixture of fluor-spar and lime or magnesian lime or magnesia, and water is added until a mortar is made.

If preferred, the lime, magnesian lime or magnesia, and the fluor spar may be mixed with water greatly in excess of that required to make a mortar, and the previously fritted and ground mass may be separately mixed with water greatly in excess, or so that it will be largely in suspension, and the two mixtures are then put together and thoroughly stirred and mixed, and the water is then allowed to drain away from the mass. The proportions I have found advantageous are about ten (10) per cent. of fluor-spar and ninety (90) per cent. of lime, magnesian lime, or magnesia, by bulk, when the linings are to be used for steel-converting furnaces; but when lower temperatures are to be used a larger proportion of fluor-spar may be used in the compound. The proportion of the previously heated or fritted mass may be from one-third to one-sixth that of the fluor-spar and lime or magnesian lime, by bulk.

If desired, the fritted and ground mass may be added to lime or magnesian lime without other fluor-spar than that contained in the fritted mass; or the fluor-spar may be omitted from the mass to be fritted. When the fluor-spar is omitted from either the mass to be fritted or from the mixture afterward made the fluor-spar in the other portion of the compound should be correspondingly increased.

The compound may be used in a wet state, as mortar, and applied directly to the furnace, converter, or other vessels; or it may be molded into brick and dried at the ordinary temperature of the atmosphere, after which they are ready for use; or they may be made in molds, preferably of plumbago, and burned in kilns at the highest temperature, the brick remaining in the forms while burning, if desired.

What I claim, and desire to secure by Letters Patent, is—

1. The compound for furnace-linings and fire-brick, consisting of a compound of fluor-spar and lime or magnesian lime and water, in the proportions specified, fritted, and then ground and mixed with an addition of fluor-spar and lime or magnesian lime and water, in the proportions specified and set forth.

2. The process of making a compound for furnace-linings or fire-brick, consisting in mixing fluor-spar and lime or magnesian lime and water, in the proportions specified, fritting the same, and then grinding the fritted mass and mixing it with fluor-spar and lime or magnesian lime (unfritted) and water, in the proportions specified and set forth.

JAMES HENDERSON.

Witnesses:
G. G. FRELINGHUYSEN,
W. L. BENNEM.